US007748148B2

(12) United States Patent
Reiland et al.

(10) Patent No.: US 7,748,148 B2
(45) Date of Patent: Jul. 6, 2010

(54) DISPLAY SIGN ADAPTED TO BE BACKLIT BY WIDELY SPACED LIGHT EMITTING DIODES

(75) Inventors: Dennis J. Reiland, North Oaks, MN (US); Donald L. Robertson, Eagan, MN (US); Brian J. Randall, White Bear Lk., MN (US)

(73) Assignee: e-llumineering LLC, Blaine, MN (US)

( * ) Notice: Subject to any disclaimer, the term of this patent is extended or adjusted under 35 U.S.C. 154(b) by 117 days.

(21) Appl. No.: 11/895,984

(22) Filed: Aug. 27, 2007

(65) Prior Publication Data

US 2009/0056183 A1      Mar. 5, 2009

(51) Int. Cl.
*G09F 13/04* (2006.01)

(52) U.S. Cl. .............................. 40/564; 40/573; 40/581; 362/311.01; 362/812

(58) Field of Classification Search .................. 40/541, 40/564, 573, 580, 581; 362/311, 351, 812
See application file for complete search history.

(56) References Cited

U.S. PATENT DOCUMENTS

| 3,694,945 | A | * | 10/1972 | Detiker ........................ 40/615 |
| 3,840,873 | A |   | 10/1974 | Usui |
| 4,012,632 | A | * | 3/1977  | Stone .......................... 362/23 |
| 4,271,408 | A |   | 6/1981  | Teshima et al. |
| 4,443,835 | A | * | 4/1984  | Brautigam et al. ......... 362/300 |
| 4,845,481 | A |   | 7/1989  | Havel |
| 4,977,695 | A | * | 12/1990 | Armbruster ................. 40/541 |
| 5,027,258 | A | * | 6/1991  | Schoniger et al. ........... 362/629 |
| 5,499,112 | A | * | 3/1996  | Kawai et al. ................. 358/475 |

(Continued)

OTHER PUBLICATIONS

"Signage Manual EMEA," Holiday Inn Hotels, http://dts-ffe.com/hi/HI_Signage_Manual.pdf, Jun. 2002.*

*Primary Examiner*—Gary C Hoge
(74) *Attorney, Agent, or Firm*—James V. Harmon

(57) ABSTRACT

A backlit display sign includes a rear sign enclosure element at the back of the sign with a forwardly facing wide mouth opening. Extending across the mouth opening is a front sign element or cover formed from an optically transmissive light guide which extends laterally across the mouth opening of the display. Light diffusing (scattering) reflective layers on the front and rear surfaces of the guide or within the guide itself make the guide a light propagation sustaining channel that serves to funnel light rays laterally and forwardly within itself to an image-producing opening where the light is allowed to be emitted for producing the image of a symbol, letter, number or other indicia that is visible on the front of the display. A light cavity between the front cover and the rear sign enclosure element contains at least one illuminating device, e.g. a light emitting diode (LED), to provide visible illumination that is transmitted from within the light cavity through the guide to the front of the sign. A light reflective layer is provided on the inner surface of the rear sign enclosure to direct rays forwardly. A light tunnel can be supported within the sign to furnish light of a selected color from a second light source within the tunnel to a portion of the sign within the bounds of the light tunnel where the different color is provided than that of the illuminating device used for the rest of the sign.

12 Claims, 5 Drawing Sheets

U.S. PATENT DOCUMENTS

| | | | |
|---|---|---|---|
| 5,536,558 A * | 7/1996 | Shelton | 428/167 |
| 5,913,617 A * | 6/1999 | Helstern | 40/564 |
| 6,149,283 A | 11/2000 | Conway et al. | |
| 6,236,382 B1 | 5/2001 | Kawakami et al. | |
| 6,282,821 B1 * | 9/2001 | Freier et al. | 40/564 |
| 6,598,328 B2 | 7/2003 | Aeling et al. | |
| 6,641,880 B1 | 11/2003 | Deyak et al. | |
| 6,717,526 B2 | 4/2004 | Martineau | |
| 6,978,566 B2 * | 12/2005 | Broelemann | 40/564 |
| 7,015,877 B2 | 3/2006 | Lei et al. | |
| 7,186,003 B2 | 3/2007 | Dowling et al. | |
| 2001/0053071 A1 * | 12/2001 | Yoda et al. | 362/23 |
| 2005/0265028 A1 * | 12/2005 | Creemers et al. | 362/297 |

* cited by examiner

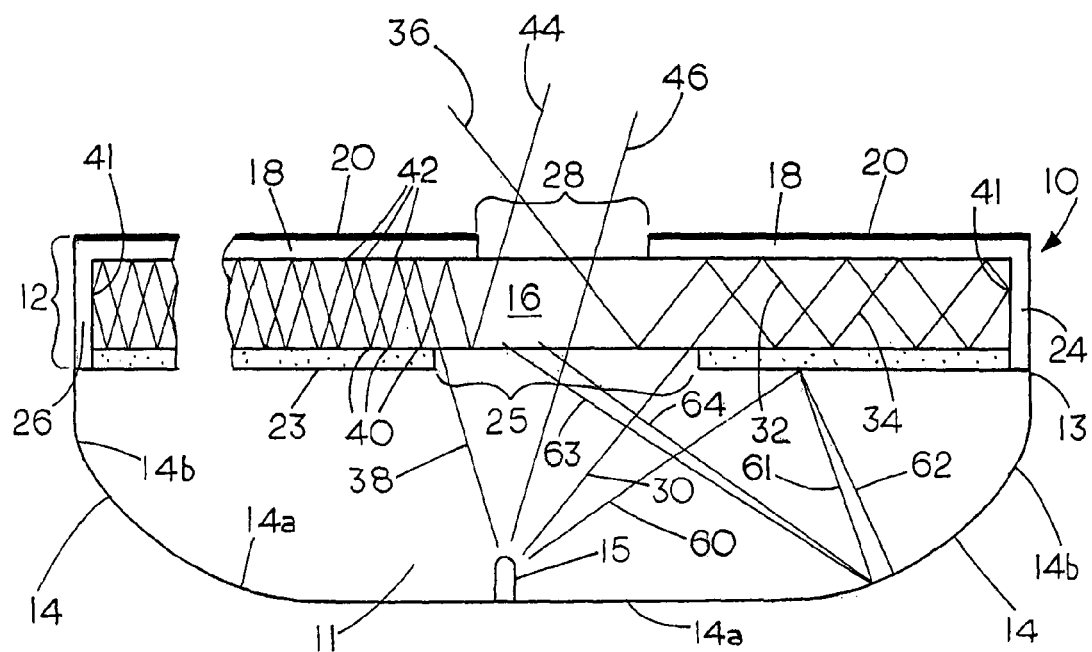

DISPLAY SIGN ADAPTED TO BE BACKLIT BY WIDELY SPACED LIGHT EMITTING DIODES

FIELD OF THE INVENTION

This invention relates to backlit display signs, markers, perimeter lighting, and the like, and to backlit light emitting diode (LED) signs.

BACKGROUND OF THE INVENTION

Neon display signs while very bright are expensive to produce and subject to high operating and maintenance costs. The maintenance costs may be as high as 30% or more annually and include glass tube breakage, transformer failure, corrosion, electrical shorts that cause fires, hazardous disposal requirements and other costs. Neon signs in addition operate at from about 3,800 to 15,000 volts. Other kinds of lamps such as high intensity discharge, HID, metal halide lamps are rarely used because replacement lamp cost, short lamp life, high heat inside sign box cavities and hazardous disposal of failed lamps. Florescent lamps have shortcomings similar to HID lamps with the exception of lamp cost. Consequently, light emitting diode (LED) lighting is preferred for use in the present invention.

Backlit LED display signs that are in commercial use, exemplified by U.S. Pat. No. 6,717,526, often employ 100 or more LED lights which are generally positioned about ½ inch to 1 inch apart in rows, columns, and lines usually aligned beneath a symbol, a word, or letter to be illuminated on a front cover of the sign. This construction makes the sign expensive and complicated to construct. In some prior LED signs, the LED's or other lights are spread somewhat farther apart but at a substantial reduction in brightness which makes the sign less useful especially for daytime operation and gives the sign less marketing appeal because it appears dim compared, for example, with a neon sign of comparable size. Moreover, the brightness of some signs varies from one part of the sign to another, a condition sometimes referred to as "hot spots", which is, of course, unacceptable. Other attempts to produce signs with LED's spaced more than an inch or so apart have only resulted in signs that exhibit "hot spots", and have a depth of over 5 inches which makes them unsuitable for many applications. By contrast, an important objective of the present invention is to provide a sign that is no more than 3 inches in depth, yet is free of "hot spots".

U.S. Pat. No. 6,236,382, for example, describes an LED display unit having a lens to which a light diffusion material has been added. However there is no provision for channeling, confining, or guiding light rays within a sign element or for producing visible symbols on the front surface of the lens. U.S. Pat. No. 6,717,526 describes an LED lighting device with rows of lights, each made up a great many LED's, e.g. 27 LED's in a single row that can be used, for example, as a traffic signal. In this case, rows of LED's are covered by a multiple collimating element made of acrylic that has multiple circular or linear collimating zones arranged to match the concentric circles or linear rows of LED's but there is no provision for confining or guiding light within a sign element or for producing an image representing letters or numbers on the front surface of the device.

U.S. Pat. No. 6,978,566 describes a backlit sign that employs LED's enclosed beneath a transparent colored layer and a transparent plastic sheet that has printed symbols on the rear or inside surface of the plastic sheet. Again, there is nothing within or upon either the plastic sheet or the translucent colored layer to confine, direct or channel light rays through a body of light-transmissive material prior to being emitted to enhance the image on the front surface of the sign. Moreover, black undercoating layers that are used absorb incident light present within the milky-white cover thereby reducing the brightness of the sign. U.S. Pat. Nos. 6,598,328 and 6,641,880 disclose plastic films that can be used in a sign but do not disclose the construction of a complete sign nor a low LED density sign construction.

In view of these and other shortcomings of the prior art, it is one object of the present invention to provide a backlit display sign employing one or more point light sources such as an LED light source to illuminate at least one opening at the front of the sign to produce a line, symbol, alphanumeric representation, or other indicia including a provision for efficiently channeling light energy to the opening on the front of the sign to achieve a level of brightness comparable to that produced by a neon sign of a similar size but at a much lower operating cost and with far fewer LED's than are currently required.

Another object of the invention is to provide a backlit display sign of the type described which has features that make it possible to use a small number per area, e.g. 1 LED per ft.$^2$ in a sign with an efficiency high enough so that the LED's no longer need to be placed in rows, columns, or lines aligned under openings where the light is to be visible on the front surface of the sign and yet does not exhibit "hot spots".

Another more specific object of the invention is to provide an improved backlit display sign characterized by brightness similar to that of a neon sign even though illuminated by LED's at a low density per unit area of sign coverage, by which is meant that the LED's are more than 2 inches apart.

Yet another object of the invention is to provide a backlit display sign which is rugged in construction and more quickly and readily manufactured at a lower cost than prior signs yet provides outstanding visibility, light uniformity and sufficient brightness to make it suitable for daytime use.

Another object of the invention is to provide a sign of the type described which is virtually free of bright spots or other objectionable variations in the amount of light emitted throughout the sign while at the same time making it possible for the sign to have a shallow depth from front to back.

A further object of the invention is to provide a backlighted display sign with a feature for more efficiently collecting, directing, guiding, and emitting light in specific areas where symbols, letters, and numbers are to appear so that a sign of commercially acceptable brightness can be achieved with a small number, typically a total of 1-5 LED's.

Still another object is to provide a display sign of the type described which exhibits outstanding brightness yet has a depth of only about 3 inches or less.

Another object is to provide an LED light display that consumes about 30-80% less electrical power than similar commercially available LED light displays of similar brightness.

These and other more detailed and specific objects of the present invention will be better understood by reference to the following Figures and detailed description which illustrate by way of example but a few of the various forms of the invention within the scope of the appended claims.

BRIEF DESCRIPTION OF THE FIGURES

FIG. 1 is an optical diagram to illustrate the construction of one preferred form of the invention and its operation.

FIG. 2 is a diagram similar to FIG. 1 to show another embodiment of the invention.

SUMMARY OF THE INVENTION

Figure 3:
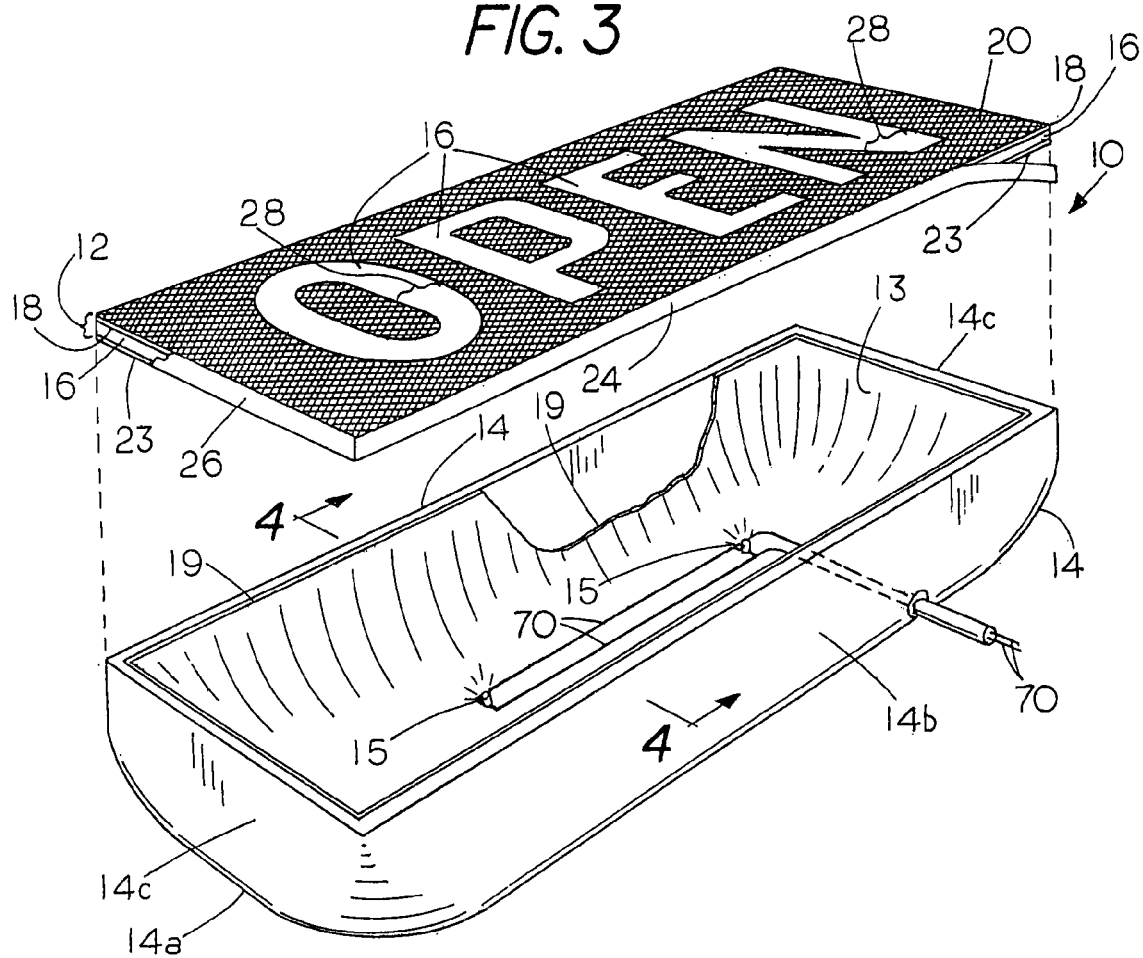
FIG. 3 is an exploded perspective view showing an illuminated display sign in accordance with the invention.

The present invention provides a backlit illuminated display sign that includes front and rear elements preferably comprising a rear sign enclosure element at the back of the sign that has a light reflective inner surface and a wide mouth opening that faces forwardly. Extending across the mouth opening is a front sign cover element. The cover includes an optically transmissive element, typically a rigid sheet of plastic resin with a provision for enabling it to function as a light propagation channel in which light rays are funneled to an image-producing opening where the light is emitted for producing an image. A light cavity is provided between the front cover and the rear sign enclosure element. At least one LED light source is operatively associated with the sign to provide visible illumination within the light cavity. The light-transmissive element is converted into a light channel by a light-reflective layer provided on its inner and outer surfaces to create a light guide. The surface layers reflect light rays within the guide that emanate from the light source back into the light guide such that the light guide acts as a light propagation channel which traps and carries the light laterally and vertically through the light guide until emitted through the opening in the outer light-reflective layer to produce visible symbols, letters, numbers, or other indicia that can be seen by an observer viewing the front surface of the sign. The inner surface of the rear sign enclosure is a highly reflective material that efficiently reflects light rays from the light source forwardly into the optically-transmissive sheet element where they are guided effectively to one or more openings on the front of the sign.

In a preferred form of the invention, the light guide is a self-supporting structural cover element comprising a transparent plastic sheet. In another form the plastic sheet contains a light diffusing material, e.g. a sheet formed from clear plastic resin, such as an acrylic or other plastic resin in which is dispersed a minor amount of light-diffusing material such as particles of titanium dioxide, zinc oxide, silica, or other suitable diffusing material for producing diffuse, i.e. scattered light, giving the plastic sheet a translucent (hazy or misty) appearance through which light can pass.

Both the surface of the light-transmissive cover element and the cavity in which the light source is located are substantially devoid of light-absorbing material such as light-shading partitions, webs, or patches of black paint on the inside surface of the sign face that were used in some commercial products. By having the light cavity open and free of light-absorbing surfaces, a significant amount of the light from the light source is able to pass out through one or more openings in the cover where the light is intended to be visible. As a result of the light guiding principles described herein, relatively few LED's are required allowing the LED array to be at a low density per unit area such that the LED's are more than 2 inches apart and preferably more than 3 inches apart. Top emitting or side emitting LED's can be used. Typically a total of only about 1-5 LED's are needed for a sign that is 24 inches long and 8 inches wide.

DETAILED DESCRIPTION OF THE PREFERRED EMBODIMENTS

Refer now to FIGS. 1 and 2 which illustrate the major components of the invention and include light rays to show diagrammatically the operation of the invention. In FIG. 1 a backlit display sign indicated generally by the numeral 10 includes a sign front face cover element 12 on which a visible display is seen from above in this case and a rear sign enclosure element 14 having an open wide mouth 13 which is covered by the face cover element 12 to define a light chamber 11 between them that contains a light source, in this case an LED 15 of a suitable commercially available type such as a top-emitting LED, for example a Lumileds Luxeon Star I, III and Rebel LED for emitting white, bluish white, or colored light as desired. Commercially available LED's can be selected to provide desired color. The LED 15 typically provides more than 20 lumens.

The front face cover 12 includes an optically transmissive self-supporting rigid sheet of transparent acrylic plastic 16 which is suitably connected, for example, by adhesive or fasteners such as screws to the open mouth 13 of the rear sign enclosure element 14. While signs of any size can be made, the transparent plastic element 16 typically has a thickness of about ⅛ inch and a width often of about 6-12 inches. The outer surface of the acrylic plastic sheet 16 is covered by a reflective layer of paint or film comprising in this case an opaque sheet 18 of diffuse reflective material that allows minimal visible light to pass through it, such as a sheet of plastic film in which particles of light-diffusing material have been dispersed. The side and end edges are covered by a similar material as shown at 24 and 26 since it was found that light which escapes if the edges are not covered by a reflective layer substantially reduces the brightness of the image. An example of one such film is 3M Block-Out Film 3635-22B which is an opaque plastic film in which pigment particles, e.g. $TiO_2$ or other fillers are dispersed. On the inner surface of the sign front face is a layer 23 of a translucent light diffusing plastic film which allows a selected portion of the incident light to pass through it, preferably from about 30-95% and most preferably from about 50-70%, the best being about 60% transmission. One example of a suitable film is 3M Diffuser Film 3635-70 translucent diffuse reflective film. We have found that if the layer 23 transmits over about 95% of the incident light, there is a tendency for bright spots to appear on the face of the sign. However, if it transmits less than 30%, the sign suffers from a lack of brightness. Therefore, providing a diffuse reflective film 23 on the inner surface of the guide 16 that is characterized by allowing less than 95% transmission of incident light alleviates the problem of bright spots at the front of the sign. The most preferred film 23 is reflective translucent plastic film with a misty appearance that can be colorless or colored, e.g. blue, red, green, or any other color. The layers 18 and 23 are conveniently bonded to the acrylic element 10 by pressure-sensitive adhesive (not shown). The diffuse light reflective layer 18 is preferably opaque plastic film filled with light diffusing particles which may reflect as much as 99% of the incident light.

On the outside of the layer 18 is an opaque coating or film 20 that is provided with one or more openings 28 shaped to form letters, numbers, or other symbols to permit light that is channeled through the light guide 16 to be emitted where light is to be visible. The lower layer 23 has an optional opening at 25. The opening 28 is preferred to be offset from opening 25. Although the diffusing film 23 is clear plastic that contains light-diffusing particles, it appears translucent when viewing an object placed directly behind it. The diffusing film 23 can have additional light-diffusing particulate material, e.g. $TiO_2$ particles or other particles dispersed within it provided the particulates allow light to pass through the film. If a color effect is desired, the layer 23 can be formed from a colored plastic material such as a red, blue, or yellow light-diffusing plastic film. Colored films, however, may reduce the brightness of the sign.

Coated on the inside surface of the rear sign enclosure element 14 is a diffuse light reflective layer 19 (FIGS. 3-5) much like the diffuse light reflective film 18. Layer 19 is a highly reflective coating layer that is bonded to element 14. The diffuse light reflective layer 19 is preferably reflective paint, although a diffuse reflective film or other coating can be used in place of paint. The reflective paint layer 19 should reflect more than 50% of the incident light and preferably more than 90% of the incident light.

The invention achieves excellent brightness even though LED's are used in a low density per unit area. In accordance with the invention, the LED's are used at a low density per unit area that is typically more than 2 inches and often as much as 6 inches or more apart, whereas previously rows of LED's ½ inch to 1 inch apart were placed in rows that often required 100 or 150 individual LED's to provide a brightness equivalent to that achieved by the present invention with less than 10 LED's. The term "low density LED's" herein means LED's positioned no less than about 2 inches apart.

The reflection of light rays will now be traced in FIG. 1 to show the operation of the invention. First, consider the ray 30 from LED 15 which makes contact with diffuser 23. A portion of the light is reflected back into the sign enclosure. The ray enters the optically transmissive light guide 16 and is reflected back into the light guide 16 after making contact with diffuse light reflective layer 18 such that the light guide serves as a light propagation sustaining channel indicated by ray 34 which impinges on the side edge at 41 and is reflected back toward the center where it exits as indicated by ray 36. In this way the optically transmissive guide 16 serves to trap and funnel light laterally through the guide 16 until it is able to be emitted through the opening 28 in the outer diffuse light-reflective layer 18 to produce visible symbols, letters, numbers, or other indicia that can be seen by an observer viewing the front or outer surface of front face cover 12. Other rays, for example ray 38, emanating from the LED 15 travel upwardly and toward the left and are reflected inwardly from the upper and lower layers 18 and 23 at 40 and 42 and at the side edge at 41 so as to be channeled through the guide 16 until they exit at 44 to provide a bright image that can be seen in the open area 28 to represent a number, letter, symbol, or other indicia.

The layers 18 and 23 are characterized by reflecting diffuse or scattered light from their surfaces. The layer 18 reflects nearly 100% of incident light internally within guide 16 while allowing virtually no visible light to pass through it. The layer 23 however reflects about 40% of the light within the guide 16 internally while allowing about 60% of incident light from the light source to enter guide 16 from below. Consequently, much of the light that enters the guide 16 stays within the guide so that the guide acts as a light trap until the light rays are able to pass out through the opening 28. Some of the rays can also pass directly from the LED 15 out through the opening 28 as shown, for example, by the ray designated 46.

Refer now to FIG. 2 which illustrates another embodiment of the invention wherein the diffuse light reflecting particles, e.g. $TiO_2$ or other fillers, are absent from the diffusing film 23 but are present in the light transmissive guide sheet 16 as indicated in the Figure. The reflective particles thus comprise a light reflective agency operatively associated with the light guide for reflecting sufficient incident radiations to avoid bright spots of light on the front of the sign. In this way the light is again channeled through the guide 16 which acts as a light trap until the rays are allowed to escape as shown at 36, 44, and 46 in FIG. 2 through the opening 28 where the lighted symbols or other markings are intended to appear. Various light reflective materials can be used including sheets or films described in U.S. Pat. Nos. 6,598,328 and 6,641,880 which are incorporated herein by reference. All references that are noted herein are to be considered disclosed herein as fully and completely as if the entire reference were reproduced in full within the present specification. In contrast to the prior art, it has been discovered that a highly reflective paint layer 19 is the most effective for coating the forward surface of element 14. The most preferred paint is a white $TiO_2$ pigmented paint. In accordance with the invention, the entire inside surface of the rear sign enclosure 14 is covered with the layer of diffuse light reflective paint 19 by spray painting application so as to reflect more than 90% of the incident rays of light from the LED's 15. As illustrated, for example, in FIG. 1, when a light ray 60 strikes the reflective layer 23, it is scattered as indicated by rays 61 and 62 that in turn are reflected from the paint coating 19 as rays 63 and 64 which then enter the light guide 16. While a mirror-like specular reflector can be employed in place of reflector 19, it is not preferred since it tends to produce bright points or bright spots of light which are, of course, undesirable. Therefore it is preferred to use pigmented diffuse light reflectors 18 and 19 of the kind described above for reflecting scattered, i.e. diffused, light.

Figure 4:
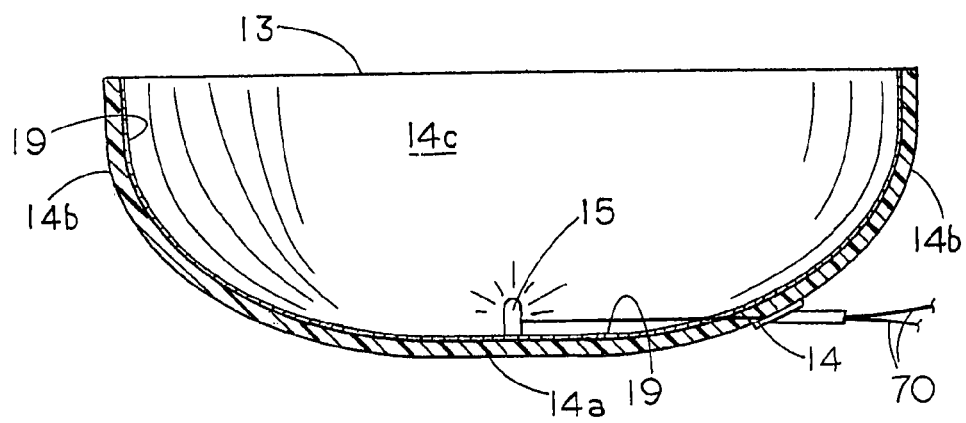
FIG. 4 is a vertical sectional view taken on line 4-4 of FIG. 3.

Refer now to FIGS. 3 and 4 which illustrate an example of a display sign in accordance with the invention wherein the same numerals refer to corresponding components already described. As seen in the Figure, the display sign 10 is provided with two LED's 15 which are powered by current supplied through conductors 70. The rear sign enclosure 14 which includes bottom wall 14a, sidewalls 14b, and end walls 14c is in this case lined by a diffuse light reflective paint layer 19 of a suitable commercially available type such as Spraylat Company Star-Brite White B70-400 Star-Brite II which is sprayed against the inner wall of the rear sign enclosure 14. While a paint coating 19 is highly preferred, the reflective layer 19 can, in the alternative, be formed from various materials such as diffuse light reflective plastic film which has a white color that is capable of reflecting 85% or more of the impinging rays from the LED's upwardly toward the sign front face cover 12 where they enter the optically transmissive light guide 16 for producing visible symbols, letters, or numbers where light is emitted through the openings 28 on the front surface of the sign. The cover 12 is connected to the open mouth 13 of the rear sign enclosure 14 in any suitable manner as by means of adhesive, mounting clips, or fasteners such as screws or other retainers or can be connected by means of a snap fit within the mouth opening 13 if desired.

Figure 5:
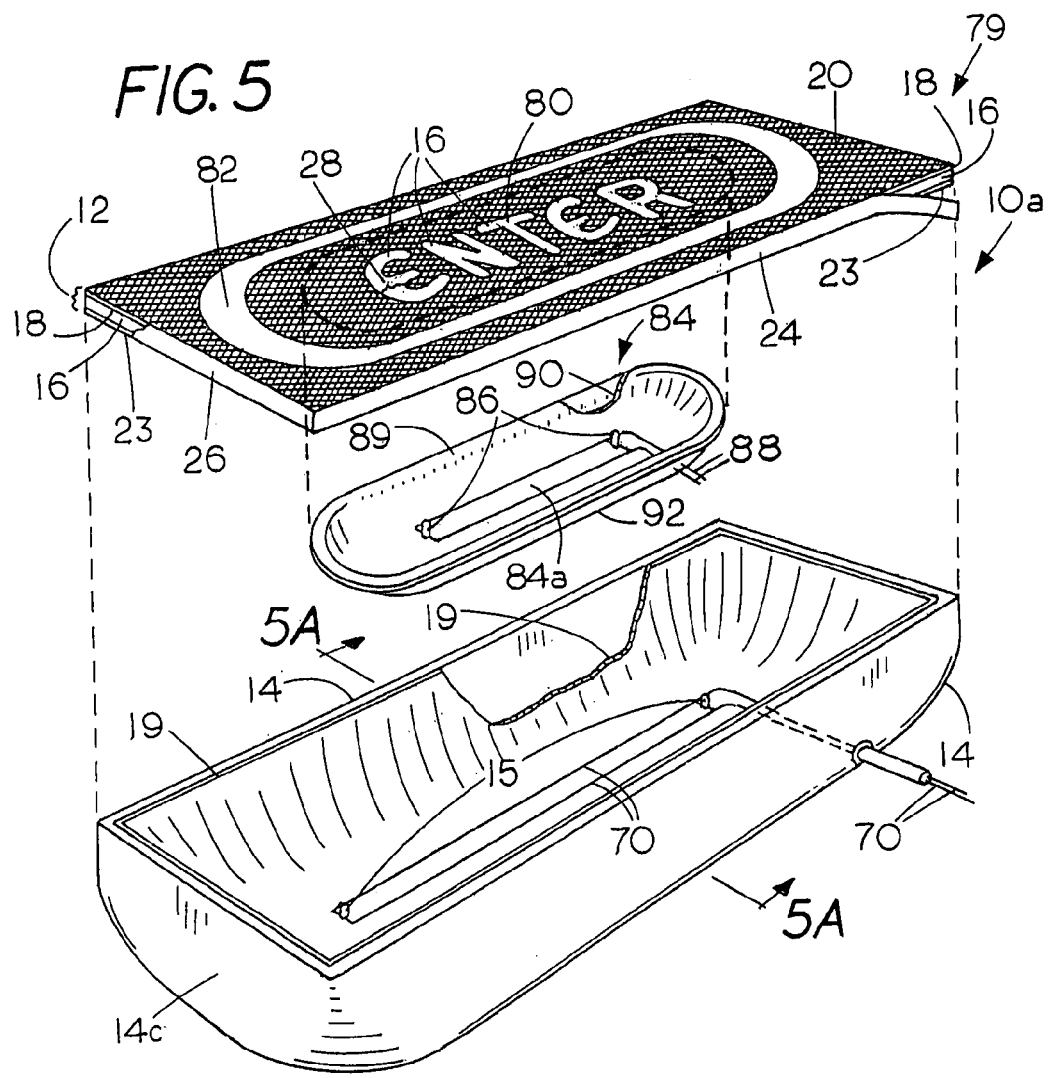
FIG. 5 is an exploded perspective view of another embodiment of the invention.
Figure 5A:
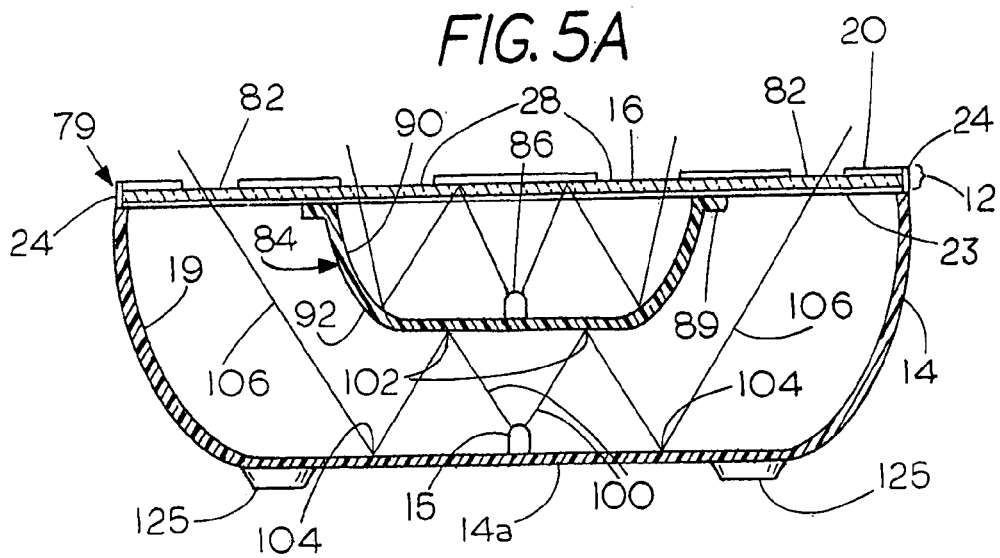
FIG. 5A is a sectional view of the assembled sign taken on line 5A-5A of FIG. 5.

Refer now to FIGS. 5 and 5A which illustrate another embodiment of the invention wherein the same numerals designate corresponding parts already described. As can be seen, the sign front face cover 12 is provided with a word, in this case "ENTER," at the center of the sign which is to be illuminated in one color such as the color red and an outer decorative illuminated ellipse 82 which in this case is to be a contrasting color such as yellow. Previously to accomplish this appearance, a complicated and expensive structure was used to separate and independently illuminate the different colored areas of the sign. Prior signs also required large numbers of LED's to achieve satisfactory brightness. However, in accordance with the invention, different colors are easily provided in selected areas while at the same time furnishing much more brilliant illumination through the use of an illuminated light tunnel 84, in this case containing only two LED's 86 that are powered by current supplied through conductors 88. The light tunnel 84 is an upwardly or forwardly opening concave cup-shaped or trough-shaped tray or dish enclosure of a size that is substantially smaller than that of the sign 79 but is large enough to enclose the lower aspect of the first image 80 at the center of the sign comprising the word "ENTER," in this case so as to illuminate the word "ENTER" with light of a first color such as red provided by the two LED's 86. The light tunnel 84 has a laterally extending centrally disposed rear wall portion 84*a* spaced apart from the front cover 12 on which are mounted the two LED's 86. Tunnel 84 is suspended from the sign cover 12 by a flat horizontally disposed rim or lip 89 which is suitably secured as by sonic welding or by adhesive, screws, or other fasteners to the inner surface of the sign front face cover 12 to face toward the cover in the area below the cover surrounding the word "ENTER" so that the word "ENTER" will be visible from the front of the sign in a red color. The light tunnel can be formed from a suitable polymeric resinous material such as a thermosetting or thermoplastic resin such as an acetate, polycarbonate resin or of other suitable material. Both the inner and outer surface of the light tunnel 84 are coated over their entire surfaces with a diffuse light-reflective layer such as a diffuse light-reflective paint for reflecting more than 50% and preferably at least 90% incident radiation. Reflective layers of the type described hereinabove are used, most preferably diffuse light-reflecting paint or LEF film as shown at 90 and 92 on both the inner and outer surfaces of the light tunnel 84. The reflective surface 92 on the outer surface of the light tunnel 84 was found to be highly effective in redirecting light at 102 from the LED's 15 outwardly and downwardly where it is then reflected at 104 upwardly at 106 onto the ellipse 82, thereby producing equally brilliant illumination for the ellipse in a contrasting color, e.g. yellow or green, so as to provide an attractive attention-getting visual appearance that is easy to see for advertising or other purposes. The light from the LED's 15 is of a different color from the LED's 86 or if the same color can be covered by a film of a different color than the LED's 86. The light tunnel 84 can conveniently be mounted in place by first applying sonic welding or adhesive to the upwardly-facing horizontally-disposed lip 89 and then bonding the tunnel to the lower surface of the face cover 12 in a position surrounding the center sign element 80 consisting of the word "ENTER" in this case. Thus, in operation, the rear sign enclosure 14 serves as a primary light cavity for illuminating the outer decorative ellipse 82 while the light tunnel 84 serves as a secondary light cavity for illuminating the center part 80 of the sign 79 in a contrasting color, e.g. red, by using LED lights at a wavelength that is different from that of LED's 15. Multiple light tunnels can be provided to illuminate different parts of a sign in as many colors as desired.

Figure 6:
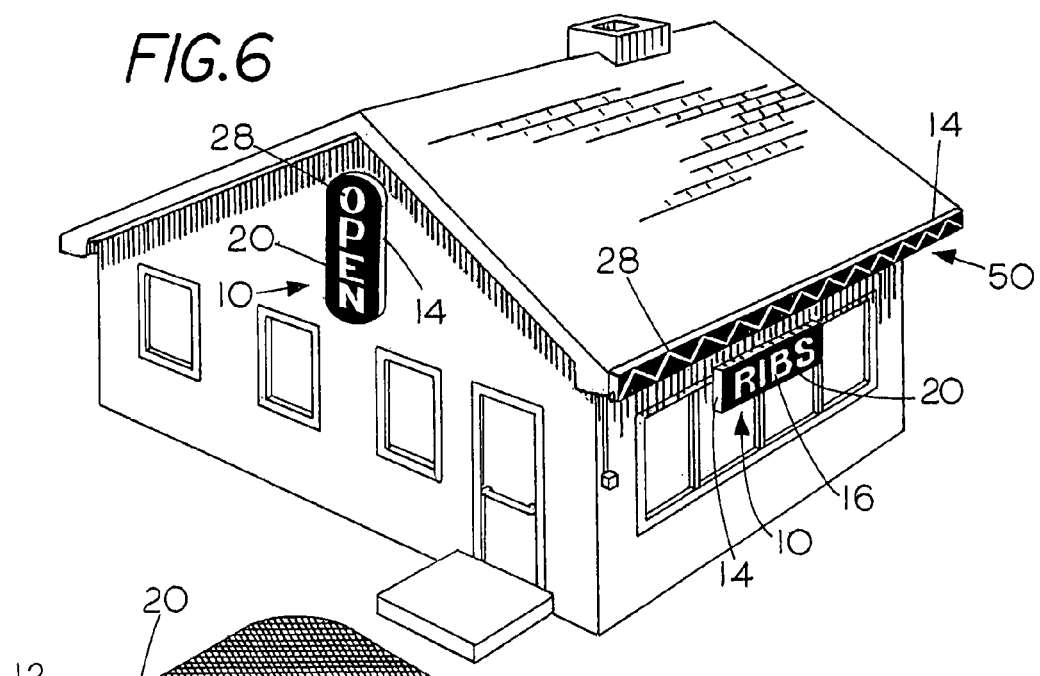
FIG. 6 is a perspective view showing a typical installation of the invention on a building.

Refer now to FIG. 6 which illustrates typical applications of the invention. The sign 10 can be used for attracting attention to a building, in this case a restaurant with the words "OPEN" and "RIBS," and for perimeter lighting as shown at 50 wherein the sign comprises a greatly elongated front face cover 12 and similarly shaped rear sign enclosure 14 with an elongated zigzag opening 28 brightly lighted in any color desired to attract attention. The word "sign" is used broadly herein to refer to light-producing devices for providing lines, symbols, letters, numbers, or other indicia such as the decorative zigzag perimeter lighting shown at 28 on the right of FIG. 6.

Figure 7:
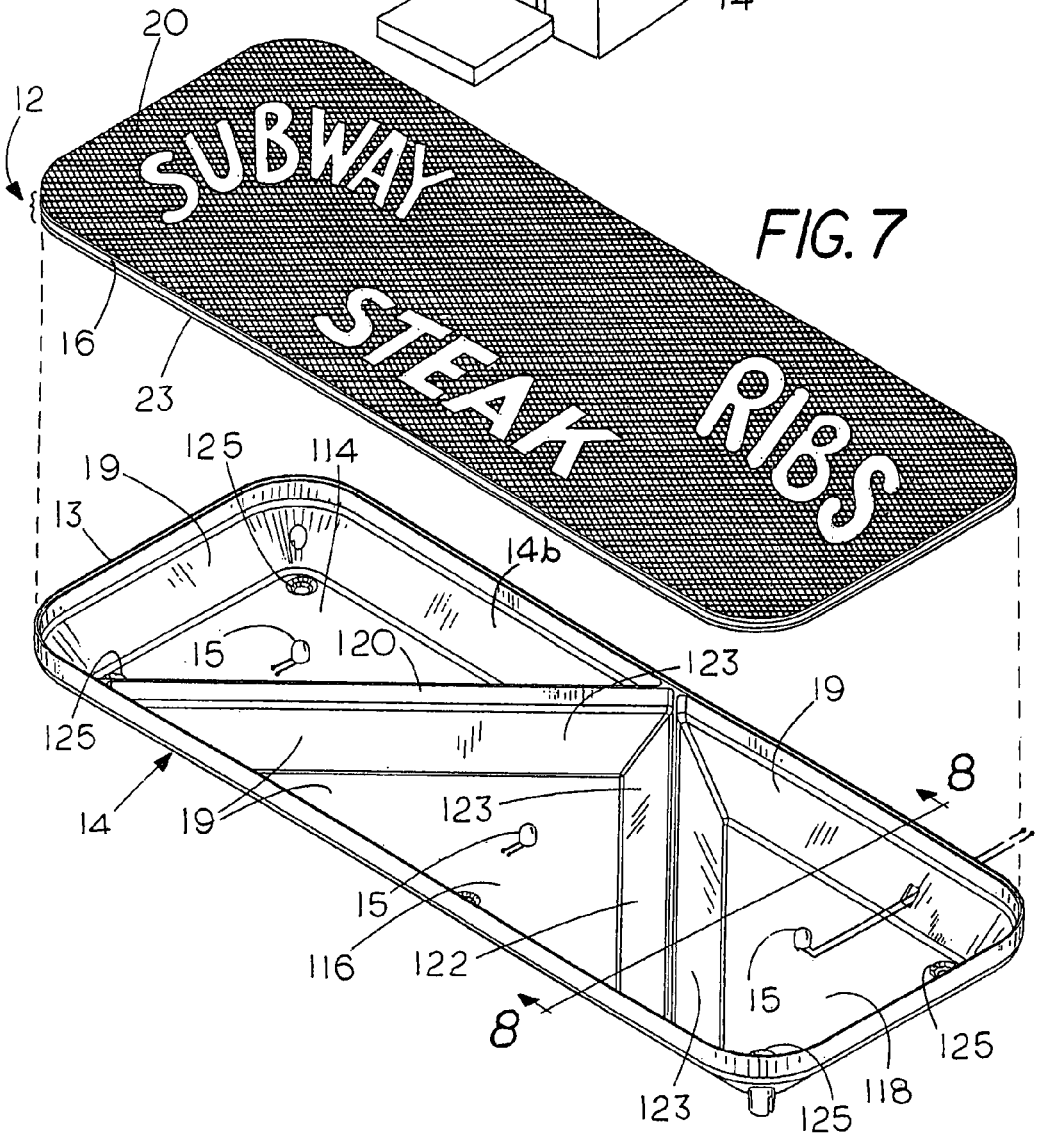
FIG. 7 is an exploded view of another sign embodying the invention.
Figure 8:
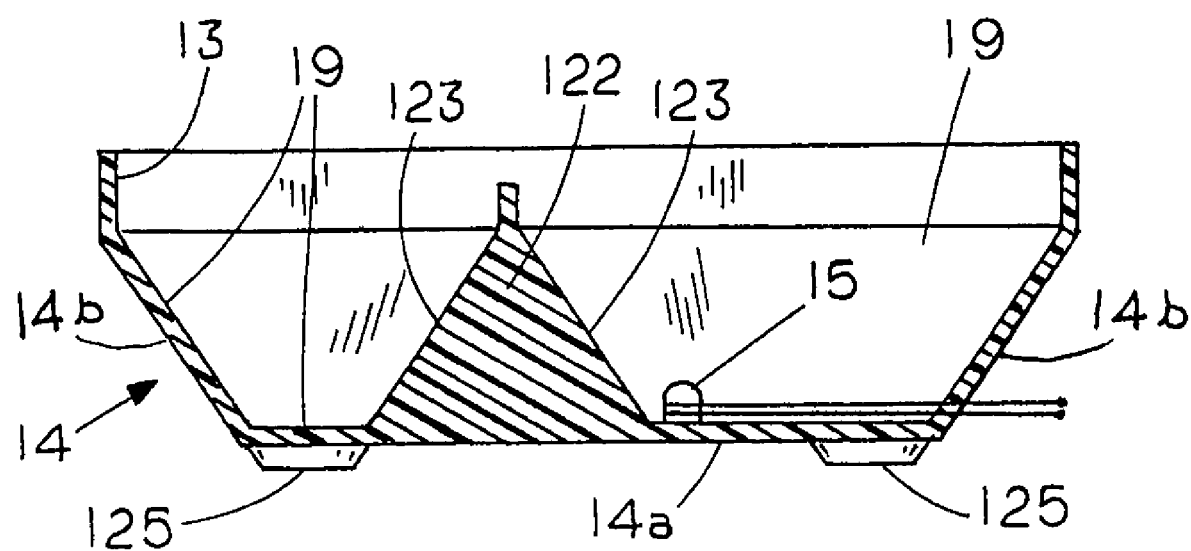
FIG. 8 is a vertical sectional view taken on line 8-8 of FIG. 7.

FIGS. 7 and 8 show an embodiment of the invention wherein the same numerals refer to corresponding parts described above in which the rear sign enclosure 14 is divided into 3 separate chambers 114, 116 and 118 by diagonal partitions 120 and 122 that project upwardly from the back or bottom wall portion 14*a* to contact the cover 12. Both sidewalls 14*b* of enclosure 14 and sidewalls 123 of the partitions 120, 122 are inclined at about 40°-60° to the bottom wall so as to reflect light of different colored LED lights 15 thereby providing a different color in each chamber to illuminate "SUBWAY", for example, in red, "STEAK" in amber and "RIBS" in yellow. On the bottom 14*a* of the enclosure 14 are standoffs 125 that provide space between a wall or other mounting surface and the bottom 14*a* of the enclosure 14 which allows air to circulate and cool the light source.

The sign is only about 2 inches in depth yet provides an exceptionally bright multicolored sign free from "hot spots" yet of a brilliance suitable for daytime use out-of-doors and comparable to that of a neon sign of equal size for only a small fraction of the manufacturing cost of a neon sign.

The present invention makes it possible to provide outstanding brightness that is comparable to the best display signs commercially available although LED's are distributed at a low density per unit area, typically between one and five that are spaced at least 2 inches and often over 6 inches apart, yet the sign produces uniform light output that is free of bright spots with a relatively thin cavity 11 which may be only ½ inch to 3 inches in depth. In addition, the invention is able to provide a brilliant sign using only 1-5 LED's, whereas a commercially available sign of about the same brightness requires 100 or more LED's.

Many variations of the present invention within the scope of the appended claims will be apparent to those skilled in the art once the principles described herein are understood.

What is claimed is:

1. A backlit display sign comprising,
a rear sign enclosure element at the back of the sign with a forwardly facing wide mouth opening,
a sign front face cover including a light guide formed from a light-transmissive material that has a front surface and a rear surface, said guide extending across the mouth opening of the rear enclosure element to define a light cavity between itself and the rear enclosure element,
at least one LED source of visible illumination operatively associated with the sign for illuminating the light cavity,
a light reflective surface layer on at least said front surface of the light guide, the light reflective surface layer on the front surface having an opening therein, said surface layer reflecting light rays which emanate from the light source that are within the light guide back into the light guide such that the light guide comprises a light-propagation sustaining channel which enhances the transmission of light through the guide until emitted through said opening in the front light-reflective layer for producing visible symbols, letters, numbers, or other indicia that can be seen by an observer viewing the front surface of the sign, and
a forwardly facing light tunnel contained within and surrounded by the light cavity, said tunnel being operatively associated with a LED light source for illuminating a portion of the sign front face cover within the perimeter of the light tunnel to provide a light of a color that is different from the color provided by the at least one LED source of visible illumination and both an inner and an outer surface of the light tunnel comprise light reflective material.

2. The display sign of claim 1 wherein the rear sign enclosure element has an inner surface covered by a light-reflective layer for reflecting light from the light source into the light guide.

3. The sign of claim 2 wherein the light-reflective layer is a diffuse light reflective layer adapted to reflect incident light as diffuse scattered light.

4. The sign according to claim 3 wherein the diffuse light reflector comprises a coating of paint having light reflective particulate material dispersed therein.

5. The sign of claim 1 wherein both the front and rear surface of the optically transmissive guide and the side edges thereof are covered by a diffuse light reflective layer.

6. The display sign of claim 1 wherein the rear sign enclosure element has an inner surface covered by a translucent light-reflective layer.

7. The sign of claim 6 wherein the light-reflective layer is a diffuse light-reflective layer adapted to reflect at least 50% of incident light as diffuse scattered light.

8. The sign according to claim 7 wherein the diffuse light reflective layer comprises a coating of paint having light-reflective particulate material dispersed therein.

9. The sign of claim 1 wherein the front and rear surfaces of the optically transmissive guide and the side edges thereof are covered by a diffuse light-reflective layer.

10. A low density LED backlit display sign comprising,
a rear sign enclosure element at the back of the sign with a forwardly facing wide mouth opening, said sign having a shallow depth of about 3 inches or less,
a sign front face cover including a light transmissive light guide formed from a sheet of self-supporting material that has a front surface and a rear surface,
both the front and rear surface of the optically transmissive guide and side edges thereof are covered by a diffuse light reflective layer for reflecting sufficient incident light radiation to alleviate bright spots of light on the front of the sign, a light source comprising an LED array mounted within said sign at low density per unit area that are no less than about 2 inches apart,
a forwardly facing light tunnel contained within the light cavity operatively associated with a light source for illuminating a portion of the sign front face cover within the perimeter of the light tunnel to provide a light of a color that is different from the color provided by the LED array, and
both an inner and an outer surface of the light tunnel comprise light reflective material.

11. The sign of claim 10 wherein the front of the sign is covered by an opaque layer containing an opening for producing visible indicia on the front of the sign.

12. The sign of claim 10 wherein the light tunnel comprises a cup-shaped or trough-shaped tray that is connected to the sign front face cover and has a low density LED array therein for illuminating a selected portion of the sign front face cover.

* * * * *